United States Patent [19]

Chassagne

[11] 4,187,044

[45] Feb. 5, 1980

[54] COAL SLURRY PIPELINING

[75] Inventor: Pierre J. Chassagne, San Mateo, Calif.

[73] Assignee: Bechtel International Corporation, San Francisco, Calif.

[21] Appl. No.: 900,230

[22] Filed: Apr. 26, 1978

[51] Int. Cl.² .............................................. B65G 53/30
[52] U.S. Cl. .................................................. 406/197
[58] Field of Search ........................ 302/14, 15, 16, 66

[56] References Cited

U.S. PATENT DOCUMENTS

| 2,920,923 | 1/1960 | Wasp et al. | 302/66 |
|---|---|---|---|
| 3,168,350 | 2/1965 | Phinney et al. | 302/14 |
| 3,637,263 | 1/1972 | Wasp | 302/66 |
| 3,719,397 | 3/1973 | Wasp | 302/66 |

Primary Examiner—James L. Rowland
Attorney, Agent, or Firm—Bertram I. Rowland

[57] ABSTRACT

A method for preparing industrial ores, e.g., coal, for pipelining and pipelining the ores to a site for subsequent processing or use.

Ore from a mine is screened into two fractions, one having a large size particle distribution and one having a small size particle distribution, each fraction retaining both the ore and the refuse. The large size particle fraction is cleaned of refuse and the clean ore therefrom crushed to a size distribution of the smaller size or small size ore fraction. The separated refuse from the large size particle fraction is ground to provide superfines to the extent required for the proper particle size distribution for pipelining. The ore and superfine refuse are combined in a water slurry for pipelining.

After pipelining the ore, the ore is cleaned and dewatered conveniently as known in the art for fine ore. The resulting ore may then be stockpiled or directly used.

6 Claims, 1 Drawing Figure

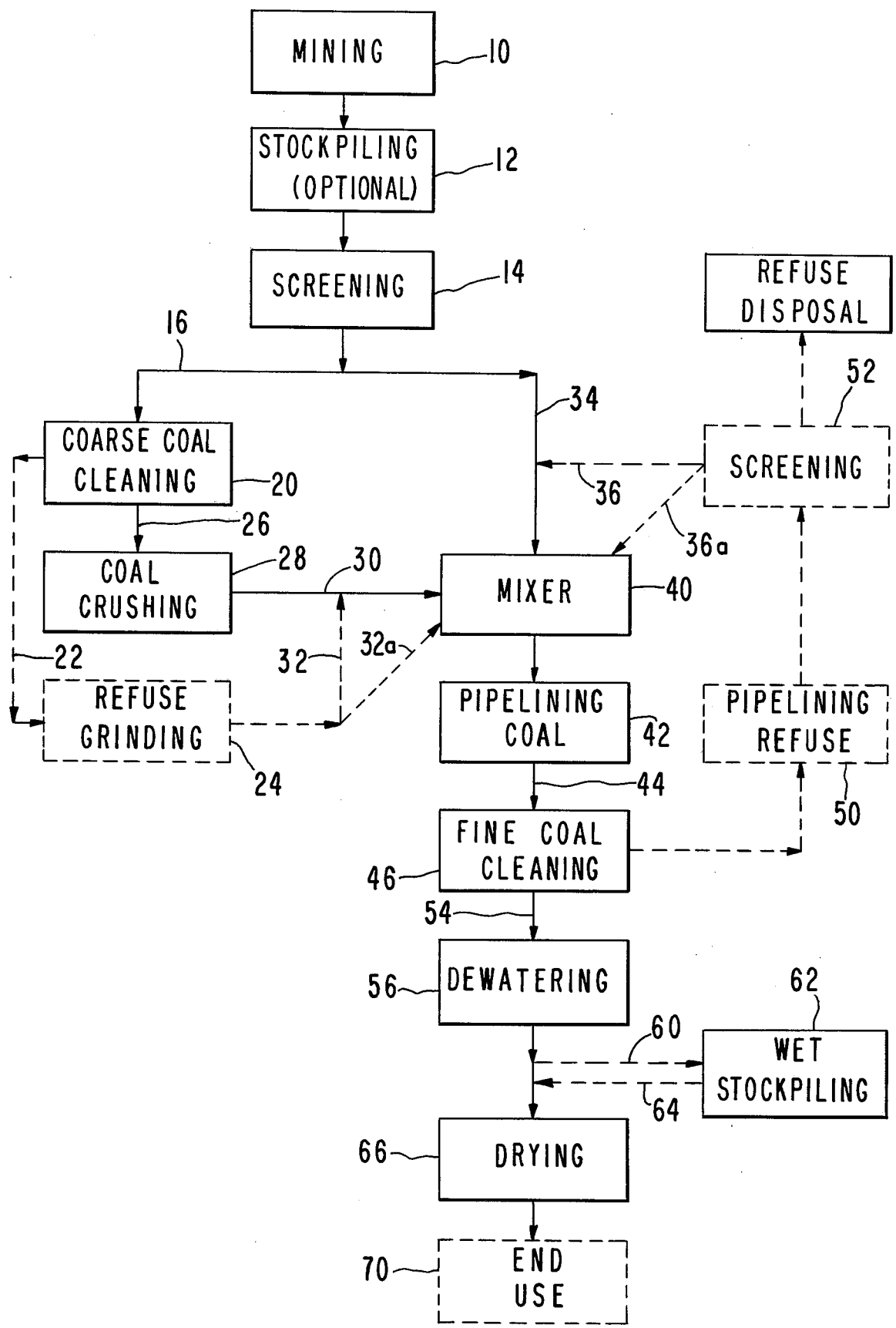

COAL SLURRY PIPELINING

BACKGROUND OF THE INVENTION

1. Field of the Invention

The economical transportation of coal becomes increasingly important as coal use as a fuel and source of chemicals expands. It is well established that in order to have successful economic pipeline transportation of coal, a particular particle size distribution is required. The coal must have a substantial weight percentage of superfine coal particles in order to have what is referred to as a low energy slurry.

The need for having superfine particles present in the slurry has required a number of expensive process steps in the normal preparation and processing of coal for pipelining and use in chemical processing or as a fuel. Conventionally, the run of mine coal has been screened to divide the coal into a coarse coal fraction and a fine coal fraction, and the two fractions each separately cleaned and then dewatered from the water used in the cleaning. The two fractions are then recombined and ground to provide the desired proportion of superfine particles for pipelining. After pipelining, the coal must be retained as a slurry because of the presence of the superfine particles. If the coal is dewatered and stockpiled at this stage, the superfines can cause spontaneous combustion and are subject to being wind blown, which can result in a thin layer of coal fines spread over a wide area, resulting in pollution and coal losses. When the coal in the slurry or slurry pond is required for use, it is dewatered and because of the presence of the superfines, expensive centrifugation equipment and slurry heating are required to remove the water.

There is substantial interest in devising new techniques which will allow for more economical and efficient preparation of coal for pipelining and use of the coal for subsequent processing, particularly for furnaces, coal liquefaction and the like. Desirably, new processing should minimize expensive grinding and dewatering, and maximize the efficiency of coal transportation in the pipeline.

While coal has assumed increasing importance, the economic transporation of other ores also remains of considerable interest.

2. Description of the Prior Art

U.S. Pat. Nos. 2,920,923, 3,168,350, 3,637,263 and 3,719,397 all describe various techniques for pipelining coal. The last patent, U.S. Pat No. 3,719,397, describes a process involving an insoluble solid carrier for use as superfines in pipelining coal. The process initially divides the coal into two fractions, a coarse and fine fraction, adds the superfine insoluble carrier to the coarse fraction, and then pipelines the two fractions separately. The coarse fraction is then screened to remove the insoluble solid carrier superfines and then superfines returned to the coal mine site for reuse with the coarse coal fraction.

The fine coal fraction is ground to the size consistency or distribution necessary for coal pipelining and after pipelining dewatered at the user end of the pipeline. This dewatering is the same as that presently used commercially in coal pipelining because the fine coal being pipelined contains superfine fractions, as the fine coal is ground before pipelining to make the superfines.

U.S. Pat. No. 3,719,397 thus does not change the fine fraction pipelining conditions, as the fine fraction defined therein represents about 50% of the run of mine coal. To utilize the above patent invention requires "slug" operation, which not only adds the inconvenience of intermediate pipeline flushing, but decreases coal capacity of the pipeline. Further, the above patent invention requires additional costs for grinding of the coal and dewatering.

SUMMARY OF THE INVENTION

An economical and efficient method is provided for preparing ores, particularly coal, for pipelining and subsequent processing and for coal, particularly for consumption in a furnace. Using coal as illustrative, the method involves dividing run of mine coal into a coarse fraction and a fine fraction and cleaning only the coarse fraction of refuse. The coarse fraction is then crushed to a particle distribution equivalent to the fine fraction and the coarse fraction refuse may be ground to provide the additional amount of superfine particles required for pipelining. The crushed coarse fraction and the original fine fraction, with any additional superfine refuse particles, are then combined as an aqueous slurry and pipelined according to conventional means. The mixture is then cleaned, followed by dewatering and stockpiling, where the coal contains only a minor amount of water but sufficient for preventing combustion, or alternatively, after dewatering the coal is dried and ready for use, as a fuel or other purposes. Optionally, the superfine particles reclaimed in the cleaning process are recycled for use in the pipeline slurry.

BRIEF DESCRIPTION OF THE DRAWINGS

The sole FIGURE is a schematic flow sheet embodying the present invention and illustrating an exemplification of the process of the subject invention.

SPECIFIC DESCRIPTION

A method is provided for the economic and efficient preparation of industrial ores for pipelining and pipelining such ores to a site for processing and use. The method is based on minimizing the employment of or avoiding the employment of expensive equipment in the grinding and dewatering of industrial ores, while maximizing efficient usage of a pipeline. The subject method is concerned with minimizing the energy required in modifying run of mine industrial ores for pipelining, processing, and use.

It has been found that for economic pipelining of industrial ore slurries, the industrial ore particles should have a certain size distribution. Included in the particle size distribution will generally be particles of $-325$ mesh (superfines) in from about 16 to 18 weight percent of the solids in the slurry. See U.S. Pat. No. 3,168,350. This distribution provides specific advantages in the energy required to move the ore slurry in the pipeline, as well as providing a mixture which does not settle to a relatively immobile intractable mass during temporary shutdown. Since the superfines are a substantial proportion of the solids of the ore, when the superfines are obtained from the ore, the processing and recovery of them requires a series of economically expensive process steps.

The subject method can be used for the pipelining of a wide variety of different industrial ores, such as bauxite, phosphate, limestone, and particularly coal. Since coal is illustrative of the other ores, for the rest of the subject specification, coal will be used as illustrative of industrial ores. Unless otherwise indicated, in speaking of coal, coal is to be considered exemplary.

In carrying out the subject invention in preparing the coal for pipelining, run of mine coal, usually from a stockpile, is screened into two fractions, a coarse fraction, which is conveniently particles of size of ¼-inch or greater (+¼-inch) and fine particles which will range from about 0 to ¼-inch (−¼-inch). The fine coal particles may then be used for pipelining without further processing.

The coarse coal is then cleaned by conventional means to remove the refuse. Refuse will normally include sandstone, clay, limestone, shale and the like. One or more of these types of refuse will be present with the industrial ores other than coal.

Cleaning can be carried out by conventional means. Coarse coal can be separated from refuse by jigging, which involves shaking with water, with the coal rising to the top. Alternatively, a heavy media can be employed, such as a magnetite suspension in water of a density intermediate between the coal and refuse, where the coal can be skimmed off.

The coarse coal fraction which is obtained is then crushed by conventional means to provide a particle distribution of −¼-inch. The refuse fraction, which may be as high as 40 weight percent of the coal, but more usually about 20 to 25 weight percent of the coal, is ground to provide superfine particles smaller than 200 mesh (containing a substantial proportion by weight of −325 mesh, greater than 50 weight percent, usually equal to or greater than 75 weight percent). The refuse will be of a high density, generally having a specific gravity of at least about 1.6. A sufficient amount of the finely ground refuse is combined in the mixer with the fine coal particles to provide the desired percentage of superfine particles for pipeline transport. The fine coal fraction obtained originally from screening, the fine coal fraction obtained from the crushing of the coarse coal, and the superfines from the ground refuse are combined with water to form a slurry having from about 35 to 60 weight percent solids, more usually from about 45 to 60 weight percent solids.

The coal slurry may then be pipelined to the site for use, where it is processed by initially being cleaned. The coal may be cleaned by conventional methods for fine coal cleaning. Such methods include hydrocyclones, heavy media cyclones, shaking tables, or the like, where the lower density coal is separated from the higher density refuse.

The refuse, which will include the refuse from the uncleaned initial fine coal fraction as well as the superfine (−200 mesh) fraction may optionally be recycled by pipeline to adjacent the coal mine site, and screened to provide a −200 mesh fraction for reuse in admixture with coal to be pipelined to provide the necessary amount of superfine particles. The refuse above 200 mesh may be discarded. Alternatively, one could discard all of the refuse, relying on the continual grinding of the refuse from the mine for the superfine fraction.

Generally, less than about 2 weight percent of the superfine fraction will be coal, since the coal was not ground, but crushed, so that only a small amount of superfine coal particles are produced. If recovery of the superfine coal is desired, the superfine coal may be recovered from the water by adding surfactant conditioning agents which form a foam to which the superfine coal particles adhere selectively. The foam may be skimmed and the coal isolated. This small amount of superfine coal represents an extremely small fraction of the total weightage of coal which has been pipelined, and may be dewatered and then used with or separately from the other fine coal.

Since the fine coal is now substantially free of superfine coal particles, the coal may be easily dewatered employing conventional means, such as screens, screen bowl centrifuges, or the like. No costly equipment for dewatering is required, since the relatively large-sized particles of the fine coal do not clog screens or normally interfere with the removal of the water.

After dewatering, the coal will normally have about 6 to 8 weight percent surface moisture and can be readily stockpiled until desired for use. The coal is not hazardous at this level of water content and may be stored for long periods of time. If the coal is to be used in a power plant as a fuel, the coal may be dried, ground further as required, and then burned. Alternatively, the dewatered coal may be dried, ground as required, and then used without stockpiling.

For further understanding of the invention, the Figure will now be considered. For example, run of mine coal is obtained from a mine 10. After conventional primary crushing, the particles will generally vary from a small amount of fine dust to having a diameter of about 5 inches, for the most part being not more than about one inch. The coal may be stockpiled, 12, and as required is removed from the stockpile 12 and then screened in a screening operation 14, or the coal may be sent directly from the mine to the screening operation 14. Normally, however, most of the coal would be stockpiled first for climatic, operational or economic reasons. The screening divides the coal into two fractions, a zero to ¼ inch fraction referred to as a fine fraction, and a ¼ inch or greater fraction, referred to as a coarse fraction.

The fine fraction is led through line 34 to mixer 40.

The coarse fraction is led through line 16 to a cleaning zone 20, where the coal is separated from the refuse. The various methods for cleaning the coal have been described previously. The refuse is removed from the coal through line 22 and may be partially or wholly discarded, but will normally be sent to a grinding zone 24 where it may be ground by conventional equipment, such as ball or rod mills. The refuse will be ground to −200 mesh, having a substantial amount of −325 mesh, greater than 50 weight percent, usually at least about 75 weight percent. The amount ground will depend upon the amount needed for providing a low energy slurry. As indicated previously, this slurry will normally have from about 16 to 18 weight percent of the −325 mesh, which is referred to as superfines.

The cleaned coarse coal is led through line 26 to a coal crushing zone 28, where the coal is crushed to −¼-inch, so as to have substantially the same particle size distribution as the fine coal. At this point in the operation, the clean coal fines are led through line 30 to mixer 40.

The fines from coal crushing zone 28 may be combined with the superfines from refuse grinding zone 24 by either introducing the superfines through line 32 into line 30 or directing the superfines through alternate line 32a directly to the mixer 40. The fines containing refuse from the screening operation 14 are led through line 34 to mixer 40, combining any recycled superfines (the method for obtaining the recycled superfines will be described subsequently) through line 36, or the recycled superfines may be introduced directly into the mixer 40 through alternate line 36a. The two fine coal fractions from lines 30 and 34 with the appropriate amount of superfines are combined in mixer 40 and slurried with the appropriate amount of water, generally forming a slurry having from about 45 to 60 weight percent solids. The slurry may be stockpiled or pipelined through pipelining zone 42 to an appropriate destination.

After arrival at its destination, the pipeline slurry is then led through line 44 to a fine coal cleaning zone 46, where the fine coal is cleaned of the refuse, by the methods described previously. Included in the refuse in slurry form will be the refuse carried with the uncleaned fine coal, as well as the superfines. Since the refuse slurry will have both superfines and particles up to ¼-inch, a low energy refuse slurry is obtained which may be readily pipelined through pipelining zone 50 to be returned to the site of the slurry preparation for pipelining. At this site, the superfine particles may be separated from the remainder of the refuse by screening 52, with part or all of the −325 mesh refuse superfines employed again as the superfines for the pipeline slurry and the larger particles discarded.

The refuse obtained from the fine coal cleaning operation 46 may be stockpiled in slurry form until a sufficient amount has been recovered to warrant its return to the slurry preparation site. Alternatively, in some instances it may be desirable to discard all of the refuse and continuously prepare fresh superfines for inclusion in the pipeline slurry. The amount of refuse obtained from the coarse coal fraction will normally be sufficient to provide the desired weight percent of superfines for the slurry, since as much as 40 weight percent of the coal ore obtained from the mine may be refuse.

Since at no time has the coal been ground, but only been crushed, only a very minor amount of the coal will be present as superfines, usually less than about 2 weight percent of the coal. Therefore, only a minimal amount of coal will be lost in the cleaning and subsequent operations, which, if desired, may be recovered, particularly from the dewatering operation.

The now clean coal from the cleaning operation 46 is transported by means of line 54 to a dewatering zone 56. Since only a small or nominal amount of coal superfines are present with the fine coal, the coal may be readily dewatered by economical conventional means, such as by screening, screen centrifuges, or the like to leave the coal having greater than 92 dry weight percent of particles in the range −200 to −¼-inch. The small amount of superfines which are present in the water may be removed, if desired, by such conventional means as solid bowl centrifuges.

The dewatered coal normally has about 6 to 8 weight percent of surface water which is sufficient to protect the coal from spontaneous combustion and allow it to be stockpiled for long periods of time. The dewatered coal may be led through line 60 to wet stockpiling zone 62 and retained there until required for use. The coal from wet stockpiling zone 62 may be withdrawn through line 64 to a drying zone 66 and then may be transferred to the power plant 70 where it may be further ground to the desired particle size for fuel use. Alternatively, the coal may be processed by any other means, such as solvent refining, hydrogenation, etc.

Economic estimates were made of capital costs and operational costs for pipelining coal according to a pipeline scheme presently employed commercially which involves separating the coal into a fine and a coarse fraction, cleaning each of the fractions, grinding coal to provide the requisite amount of superfines, pipelining the coal, and then dewatering; the scheme described in U.S. Pat. No. 3,719,397, and the present scheme. The following Table I indicates the capital costs and operating costs estimated for a 5 million ton per year plant.

TABLE I*

|  | Fine Coal Cleaning | Coarse Coal Cleaning | Grinding | Crushing | Dewatering | TOTAL |
| --- | --- | --- | --- | --- | --- | --- |
|  |  | Capital Costs In Millions of $ |  |  |  |  |
| Practiced Method | 10 | 5 | 10 | — | 18 | 43 |
| 3,719,397 Method | 10 | 5 | 7 | 0.5** | 10 | 32.5 |
| Subject Method | 10 | 5 | 2 | 0.5 | — | 17.5 |
|  |  | Operating Costs Dollars per Ton |  |  |  |  |
| Practiced Method | 1.5 | 1 | 0.33 | — | 0.567 | 3.39 |
| 3,719,397 Method | 1.5 | 1 | 0.22 | 0.02 | 0.30 | 3.04 |
| Subject Method | 1.5 | 1 | 0.06 | 0.02 | — | 2.58 |

*Costs as of '73–'74
**Extra pumping return

It is evident from the above Table I that substantial economic efficiency may be achieved, both as to operating and capital cost in employing the subject process as compared to prior art processes, both practiced and disclosed in the patent literature. Capital costs for grinding and dewatering equipment are substantially reduced or eliminated. Likewise, the operating costs to grind the coal are substantially reduced, and no expensive dewatering and slurry heating costs are incurred as simpler dewatering equipment can be used for the removal of water from the coal.

Furthermore, the subject method avoids the problem of having to maintain a slurry pond for coal superfine particles at the use site by substantially removing all of the superfine particles from the coal before it is stockpiled at the use site.

The subject method therefore provides a substantially more efficient and economical process for preparing industrial ores for pipelining and use than has heretofore been available.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A method for preparing a mined ore having a broad spectrum of particle sizes for low energy slurry pipelining which comprises:
   (a) dividing the ore into a first fine fraction and a coarse fraction;
   (b) separating from said coarse fraction most of the refuse and grinding sufficient refuse to −200 mesh to augment the amount of −200 mesh required for a low energy pipeline slurry;
   (c) crushing said coarse fraction to substantially the same particle distribution as said fine fraction to provide a second fine fraction;
   (d) combining said first and second fine fractions, to form a combined fine fraction and mixing with sufficient −200 mesh refuse and water to provide a low energy mineral particle slurry at a combining site;
   (e) pipelining said slurry to a destination;
   (f) cleaning said combined fine fraction of refuse; and
   (g) dewatering said cleaned combined fine fraction.

2. A method according to claim 1, including the steps of pipelining the refuse obtained from the cleaning of said combined fine fraction to said combining site, separating said refuse into a −200 fraction and a +200 fraction, and employing at least a portion of said −200 fraction in said low energy slurry.

3. A method according to claim 1, wherein said ore is selected from the group of ores consisting of coal, bauxite, phosphate, and limestone.

4. A method according to claim 3, wherein said ore is coal.

5. A method for pipelining coal as a low energy pipeline slurry which comprises:
   (a) screening run of mine coal to provide a coarse coal fraction of +¼-inch mesh and a first fine coal fraction of −¼-inch mesh;
   (b) cleaning said +¼-inch mesh coal fraction from refuse;
   (c) crushing said +¼-inch mesh coal fraction to form a second −¼-inch mesh fine coal fraction;
   (d) grinding sufficient of said refuse obtained from the cleaning of said +¼-inch mesh coal fraction to −200 mesh to augment the −200 mesh particles employed in a low energy pipeline slurry;
   (e) combining said first and second −¼-inch mesh fractions with sufficient −200 mesh refuse and water at a combining site to provide a low energy slurry for pipelining;
   (f) pipelining said coal to a destination;
   (g) cleaning said −¼ inch coal of refuse; and
   (h) dewatering said coal to provide coal suitable for use.

6. A method according to claim 5, including the steps of pipelining said refuse obtained from the cleaning of −¼-inch mesh coal from said destination to said combining site, separating the refuse into a −200 mesh fraction and a +200 mesh fraction and employing at least a portion of said −200 mesh fraction in said low energy pipeline slurry.